(12) United States Patent
Urata

(10) Patent No.: US 11,091,384 B2
(45) Date of Patent: Aug. 17, 2021

(54) METHOD OF MANUFACTURING POROUS GLASS DEPOSITION BODY FOR OPTICAL FIBER

(71) Applicant: Shin-Etsu Chemical Co., Ltd., Tokyo (JP)

(72) Inventor: Yuhei Urata, Gunma (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 291 days.

(21) Appl. No.: 14/034,571

(22) Filed: Sep. 24, 2013

(65) Prior Publication Data

US 2014/0090426 A1 Apr. 3, 2014

(30) Foreign Application Priority Data

Sep. 28, 2012 (JP) ............................. JP2012-215645

(51) Int. Cl.
*C03B 37/014* (2006.01)

(52) U.S. Cl.
CPC .... *C03B 37/01413* (2013.01); *C03B 37/0142* (2013.01); *C03B 2203/23* (2013.01); *C03B 2207/50* (2013.01); *C03B 2207/70* (2013.01); *C03B 2207/80* (2013.01); *Y02P 40/57* (2015.11)

(58) Field of Classification Search
CPC ............ C03B 2207/50; C03B 2207/70; C03B 37/01413
See application file for complete search history.

(56) References Cited

U.S. PATENT DOCUMENTS

| 4,826,520 A | * | 5/1989 | Kawazoe | C03B 37/0142 |
| | | | | 239/416 |
| 5,625,733 A | * | 4/1997 | Frigo | G02B 6/423 |
| | | | | 385/139 |
| 5,674,305 A | * | 10/1997 | Ohga | C03B 29/02 |
| | | | | 65/120 |
| 2003/0209038 A1 | * | 11/2003 | Jablonowski et al. | 65/382 |
| 2005/0109065 A1 | * | 5/2005 | Ichii et al. | 65/397 |

(Continued)

FOREIGN PATENT DOCUMENTS

| CN | 102173572 A | | 9/2011 |
| JP | 9-86948 | * | 3/1997 |

OTHER PUBLICATIONS

Machine Translation of JP 908694 (to Kudo et al) by JST made Jul. 6, 2017 (7 pages).*

(Continued)

*Primary Examiner* — John M Hoffmann

(57) ABSTRACT

Provided is a method of manufacturing a porous glass deposition body for optical fiber comprising depositing silica powder on a starting member being raised and rotated by using burners with different deposition positions. With a glass raw material flow rate supplied to a core deposition burner represented by $F_1$ and a total flow rate of glass raw material supplied to a cladding deposition burner adjacent to the core deposition burner represented by $F_2$, during an initial deposition stage occurring before gas conditions reach a stable state, glass raw material is supplied to points at the same longitudinal position of the deposition body such that a glass raw material flow rate ratio $F_2/F_1$ is no less than 0.69 and no greater than 1.03.

2 Claims, 5 Drawing Sheets

(56) References Cited

U.S. PATENT DOCUMENTS

2007/0137256 A1\* 6/2007 Barish et al. .................. 65/415
2007/0271962 A1\* 11/2007 Inoue et al. .................. 65/377

OTHER PUBLICATIONS

Machine translation of CN 102173572 A to Xue et al., created Jun. 13, 2018, pp. 1-26 (Year: 2018).\*
Office Action issued for counterpart Chinese Patent Application No. 201310449972.4, issued by the State Intellectual Property Office of the People's Republic of China dated Aug. 3, 2016.
Notice of Second Office Action for Patent Application No. 201310449972.4, issued by the State Intellectual Property Office of People's Republic of China dated Mar. 22, 2017.

\* cited by examiner

METHOD OF MANUFACTURING POROUS GLASS DEPOSITION BODY FOR OPTICAL FIBER

The contents of the following Japanese patent applications are incorporated herein by reference:
NO. 2012-215645 filed on Sep. 28, 2012.

BACKGROUND

1. Technical Field

The present invention relates to a method of manufacturing a porous glass deposition body, and particularly to a method of manufacturing a porous glass deposition body for optical fiber that can be manufactured using a high yield optical fiber base material with little melted residue when performing transparent vitrification by heating the porous glass deposition body.

2. Related Art

In optical fiber, light can be propagated by a difference in refractive index realized by slightly increasing the refractive index of the central portion (core) relative to the outer portion (cladding). Similarly, in an optical fiber base material, which is the state of the optical fiber prior to the drawing process, the refractive index of the central portion is slightly higher than the refractive index of the outer portion. In the case of an optical fiber that is primarily formed of quartz glass ($SiO_2$), the refractive index difference between the core and the cladding is usually realized by doping the core with $GeO_2$. In this way, the optical fiber base material uses different materials for the center portion and the outer portion, and there are many different types of manufacturing methods.

Vapor axial deposition (VAD) is a technique suitable for manufacturing large base materials, and includes manufacturing a porous glass deposition body (soot) by supplying a raw material such as silicon tetrachloride in a burner producing an oxyhydrogen flame and depositing the generated $SiO_2$ fine particles on a target object. After this, heating is performed in a sintering furnace to create transparent glass. In order to dope the core with $GeO_2$, a core deposition burner is supplied with germanium tetrachloride in addition to the silicon tetrachloride. Therefore, on top of the deposited core, the cladding is deposited by another burner from outside the core. By performing deposition with a plurality of burners in this way and forming a plurality of deposition layers, larger soot can be manufactured.

During the sintering, the soot is gripped and lowered vertically into the sintering furnace, and is heated by being lowered while facing a heat source. Within the heated soot, the internal gas is expelled as the soot contracts, thereby increasing the density and forming transparent glass, and the sintering process is then finished.

After the soot is manufactured, the transparent vitrification is performed by the heating process in the sintering furnace, but if there is unevenness in the density distribution in the circumferential direction of the soot, the transparent vitrification cannot progress smoothly and melted residue is generated. The melted residue is a phenomenon that occurs when the gas within the soot cannot escape and remains trapped inside. Then, when the heating and machining is performed with a lathe, the trapped gas expands and damages the base material, which has a harmful effect on the optical characteristics of the resulting fiber. Therefore, this melted residue is treated as a defect. In other words, the melted residue causes a decrease in yield. When there is melted residue, the negative effect on the optical characteristics of the portion around the melted residue is considered, and both the actual melted residue and the surrounding portion are judged to be a defective portion.

In order to decrease the amount of melted residue causing this defective portion, the conditions during manufacturing of the soot can be improved or the temperature and gas conditions can be optimized during the sintering. When optimizing the sintering conditions, highest priority is given to the removal of the melted residue in the trunk portion that is deposited with steady gas conditions and makes up the majority of the soot deposition body. Therefore, even when the melted residue of the trunk portion is removed, there is still melted residue at other portions, particularly at portions where initial deposition was performed prior to reaching the steady deposition conditions. As described above, both the melted residue and the region around the melted residue are treated as defective portions, and therefore the melted residue must also be removed from regions other than the trunk portion in order to improve the yield.

SUMMARY

In light of the above problems, it is an object of the present invention to provide a manufacturing method of a porous glass deposition body for an optical fiber that can improve the density distribution in the circumferential direction of an initial soot deposition portion and reduce the amount of melted residue.

In order to achieve the above objective, particularly to reduce the amount of melted residue during the initial deposition stage, the gas conditions during soot deposition were investigated, and it was found that the flow rate ratio between the glass raw material flow rate ("first silicon tetrachloride flow rate") supplied to the core deposition burner and the total flow rate of glass raw material supplied to the cladding deposition burner is important.

Specifically, the method according to the present invention of manufacturing a porous glass deposition body for optical fiber comprises depositing silica powder on a starting member being raised and rotated by using burners with different deposition positions, wherein, with a glass raw material flow rate ("first silicon tetrachloride flow rate") supplied to a core deposition burner represented by $F_1$ and a total flow rate of glass raw material supplied to a cladding deposition burner adjacent to the core deposition burner represented by $F_2$, during an initial deposition stage occurring before gas conditions reach stable state, glass raw material is supplied to points at the same longitudinal position of the deposition body such that a glass raw material flow rate ratio $F_2/F_1$ is no less than 0.69 and no greater than 1.03.

The summary clause does not necessarily describe all necessary features of the embodiments of the present invention. The present invention may also be a sub-combination of the features described above.

DESCRIPTION OF EXEMPLARY EMBODIMENTS

Figure 1:
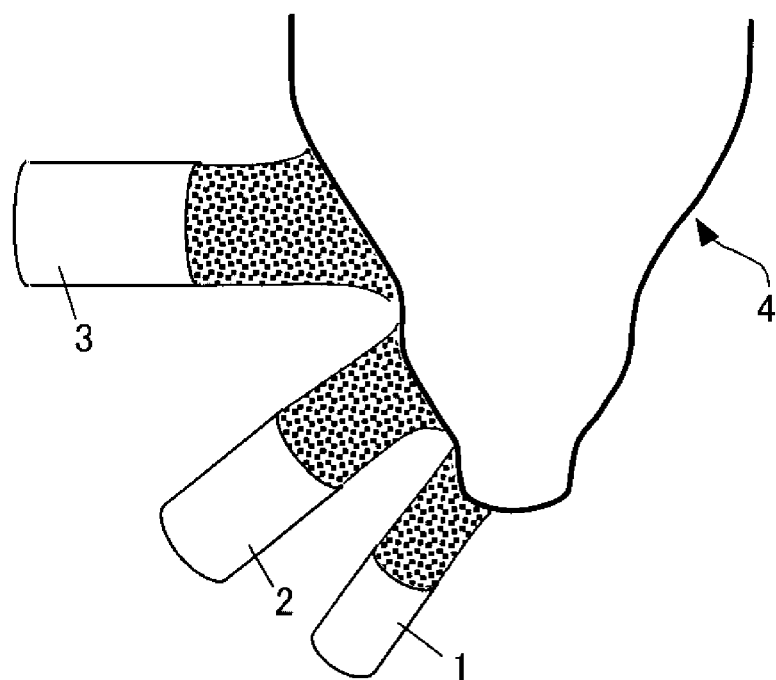
FIG. 1 is a schematic view for describing an exemplary method for manufacturing a porous glass deposition body.

Hereinafter, some embodiments of the present invention will be described, but the embodiments do not limit the invention described in the claims. FIG. 1 is a schematic view for describing an exemplary method for manufacturing a porous glass deposition body. FIG. 1 shows the state of the porous glass deposition body deposited by using a core deposition burner 1 for depositing a central core, an intermediate cladding deposition burner adjacent to the core deposition burner 1 for depositing an intermediate cladding, and an outermost cladding deposition burner 3 for depositing an outermost cladding.

In the intermediate cladding deposition burner 2 on the outside of the core deposition burner 1, not only is soot deposited from outside the core, but the flame used also serves to adjust the refractive index distribution of the core. The positioning and gas conditions for the intermediate cladding deposition burner 2 can be determined to emphasize the interference with the flame of the core deposition burner 1. Therefore, the deposited core is fired by the flame of the intermediate cladding deposition burner 2 to have increased density.

This firing is especially necessary during the initial deposition stage when the core must be securely fixed to the starting member 5. If the firing by the flame of the intermediate cladding deposition burner 2 at this stage is too weak, the soot will fall away from the starting member 5 at the stage when the deposition weight is increased, and this decreases the yield. During the initial deposition stage when the outer diameter of the deposited soot is large and a tapered portion is formed in the longitudinal direction, the raw material flow rate of each burner is gradually increased over time. Therefore, during the initial deposition stage, the raw material flow rate is lower than the flow rate of the sintering gas and the combustion supporting gas, and the firing strength and density of the flame of the intermediate cladding deposition burner 2 is higher.

Figure 2:
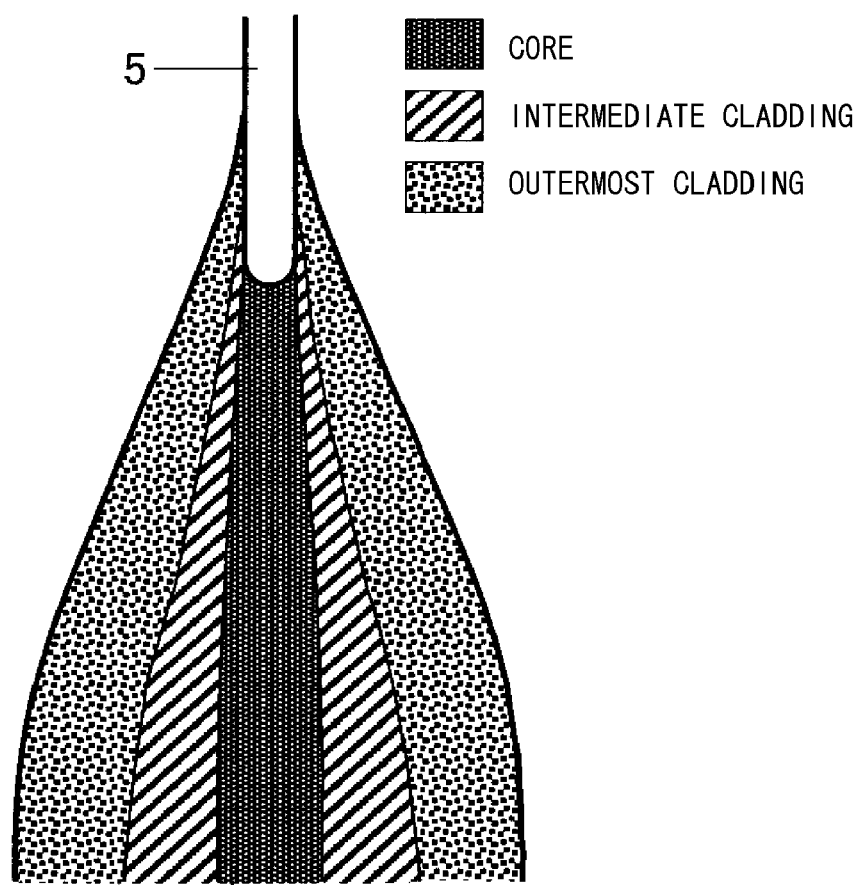
FIG. 2 shows an exemplary vertical cross section of a porous glass deposition body deposited using conventional gas conditions.

FIG. 2 shows an exemplary vertical cross section of a region deposited during the initial soot deposition step using conventional gas conditions. In FIG. 2, the starting member 5, the core, the intermediate cladding, and the outermost cladding are shown with different patterns. When performing transparent vitrification, the soot is held vertically and lowered into the heating region of a furnace, thereby beginning the transparent vitrification from the bottom end of the soot. When the transparent vitrification begins from the bottom end, the soot contracts and the gas within the soot escapes upward. When the heating process has progressed and the initial tapered portion at the top of the soot deposition has contracted, the soot density ("first density") of the location from which the gas has escaped in the soot is increased, and the diffusion rate of the gas is decreased. When the contraction rate of the soot caused by the heating is sufficient to have a larger effect than the diffusion rate of the gas, gas remains within the soot and melted residue occurs.

When the transparent vitrification through sintering is started from the core during the initial deposition stage in this manner, it is difficult for the gas to escape from the soot and there is a large amount of melted residue. The tapered region is usually treated as a portion with unacceptable optical characteristics, and therefore the effect on the yield due to melted residue in the tapered region is low, but melted residue is also present in the region with a substantially constant outer diameter, which causes a decrease in the yield.

Figure 3:
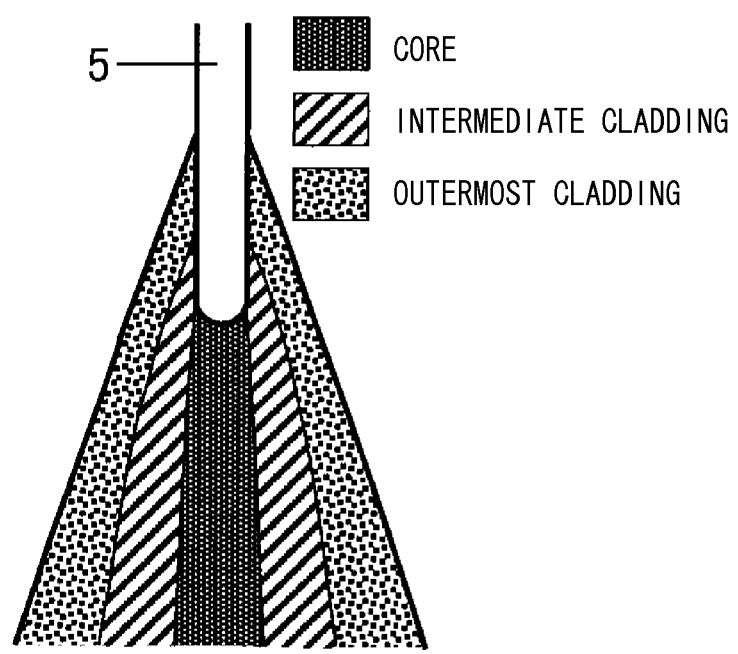
FIG. 3 is a schematic vertical cross section of a porous glass deposition body deposited with gas conditions in which a glass raw material flow rate ("second silicon tetrachloride flow rate") for the cladding deposition burner adjacent to the core deposition burner during that is greater than the conventional flow rate.

FIG. 3 shows an exemplary cross section of a region deposited during the initial soot deposition stage, in a case where the raw material flow rate ("second silicon tetrachloride flow rate") of the intermediate cladding deposition burner during initial deposition is greater than the conventional flow rate. In the same manner as the example of FIG. 2, the starting member 5, the core, the intermediate cladding, and the outermost cladding are each indicated by a different pattern. In FIG. 3, the density ("second density") of the intermediate cladding is lower than in the example of FIG. 2, and therefore the gas in the soot can more easily escape upward. It is understood that in order to manufacture the optical fiber glass base material with good yield while restricting melted residue in the initial deposition stage, it is necessary to decrease the density ("second density") of the intermediate cladding during the initial deposition stage, as shown in FIG. 3. The inventors have realized the present invention based on the investigation described above.

Specifically, The manufacturing method of the porous glass deposition body according to the present embodiment includes a method of manufacturing a porous glass deposition body for optical fiber comprising depositing silica powder on a starting member being raised and rotated by using burners with different deposition positions. With a glass raw material flow rate supplied to a core deposition burner represented by $F_1$ and a total flow rate of glass raw material supplied to a cladding deposition burner adjacent to the core deposition burner represented by $F_2$, during an initial deposition stage occurring before gas conditions reach a stable state, glass raw material is supplied to points at the same longitudinal position of the deposition body such that a glass raw material flow rate ratio $F_2/F_1$ is no less than 0.69 and no greater than 1.03. With the method of the present embodiment, melted residue in optical fiber base material can be reduced.

In this way, VAD or the like is used and, during the initial deposition stage that is before the deposition becomes steady, glass raw material is supplied to the same longitudinal positions below the tip of the starting member such that glass raw material flow rate ratio $F_2/F_1$ ("first silicon tetrachloride flow rate")/("second silicon tetrachloride flow rate") is no less than 0.69 and no greater than 1.03. As a result, the density ("second density") of the intermediate cladding is controlled within the soot deposited using a plurality of burners, and therefore density distribution unevenness in the circumferential direction of the soot is decreased and the amount of melted residue in the region that is initially deposited during transparent vitrification is reduced.

Since each burner has a different position and angle, the intersection points between the rotational axis of the starting member and the central axis of the burner is different for each burner. Therefore, there are different deposition positions at the same time. However, since the starting member is pulled upward during deposition, soot deposited from the intermediate cladding deposition burner covers the core, and soot deposited from the outermost cladding deposition burner covers the intermediate cladding. At this time, the soot deposition positions of a single burner on the base material change in a manner to trace a spiral path due to the rising and rotation of the starting member. Therefore, in order to achieve the same deposition amount, i.e. soot density, at the same positions in the longitudinal direction that change due to the rising and rotating of the starting member, it is necessary to consider the rising speed and the rotational speed of the starting member and the deposition position of each burner, and to set a suitable pattern of change for the raw material flow rate of each burner. In this case, the glass raw material flow rate ratio F2/F1 ("first silicon tetrachloride flow rate")/("second silicon tetrachloride flow rate") is adjusted. By suitably adjusting the soot density of the initial deposition region based on this idea, the occurrence of defective portions caused by melted residue can be decreased and a reduction in yield can be prevented.

Figure 4:
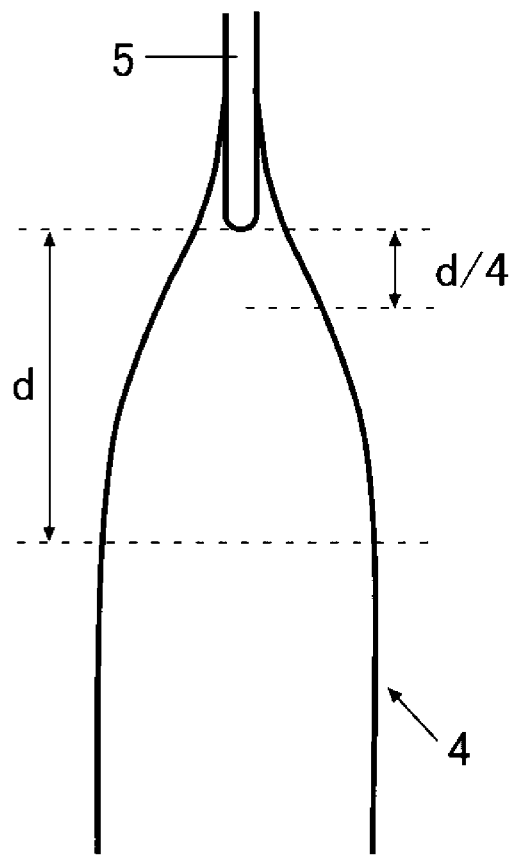
FIG. 4 is a vertical cross sectional view for describing the length d of the tapered portion formed during the initial deposition stage of the porous glass deposition body.
Figure 5:
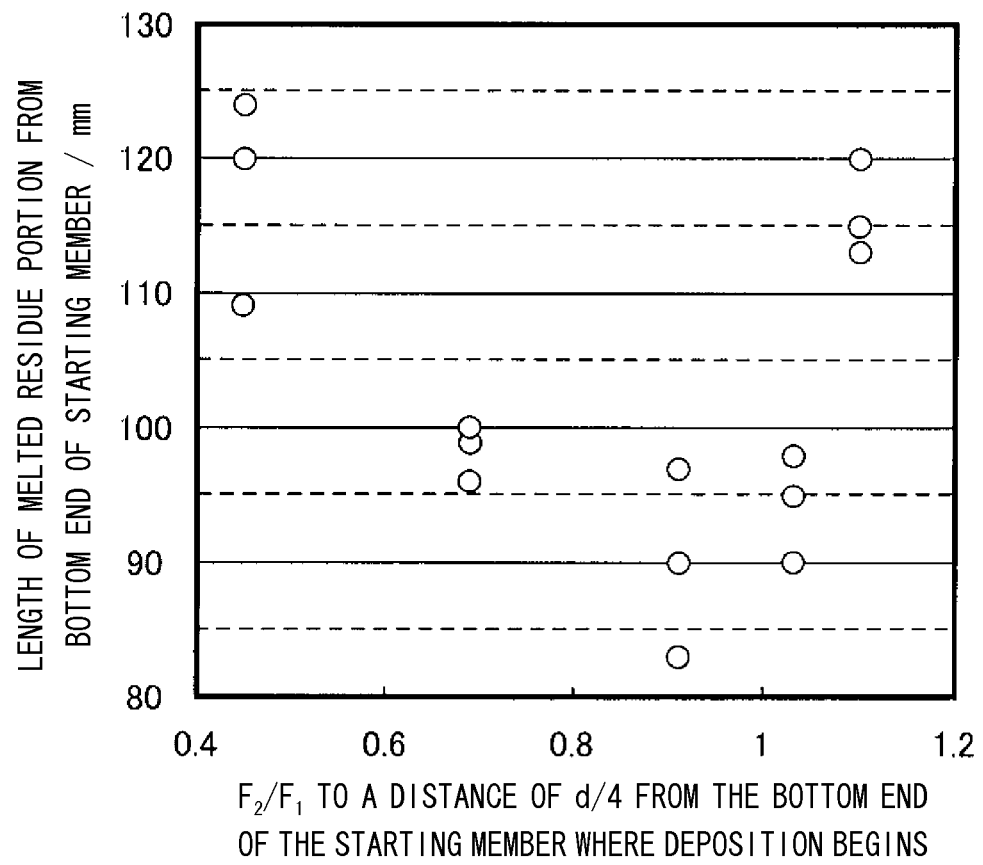
FIG. 5 shows the correlation between the glass raw material flow rate ratio $F_2/F_1$ ("first silicon tetrachloride flow rate")/("second silicon tetrachloride flow rate") for the core deposition burner and the adjacent cladding deposition burner during initial deposition of the tapered portion and the length of the melted residue region after the sintering process.

For example, among a plurality of manufactured porous glass deposition bodies such as shown in FIG. 4, where the tapered portion has a length of d from the bottom end of the starting member, the region up to a distance d/4 from the bottom end of the starting member was compared for each porous glass deposition body with a different flow rate ("second silicon tetrachloride flow rate") used to supply the glass raw material to the intermediate cladding deposition burner. The results of these comparisons are shown in FIG. 5. The horizontal axis represents the glass raw material flow rate ratio $F_2/F_1$ ("first silicon tetrachloride flow rate")/("second silicon tetrachloride flow rate") of the region up to a distance d/4 from the bottom end of the starting member, and the vertical axis indicates the distance of the melted residue region after the sintering process from the bottom end of the starting member. Based on FIG. 5, it is understood that when the $F_2/F_1$ value is higher, the melted residue portion tends to be smaller. In particular, when the $F_2/F_1$ value is 0.69 or greater, the length of the melted residue region is no greater than 100 mm, and this length falls within the tapered portion of the glass base material after sintering. On the other hand, when the $F_2/F_1$ value is 1.1 or more, the length of the melted residue region exceeds 100 mm. Accordingly, in order for the length of the melted residue region to be 100 mm or less, the glass raw material flow rate ratio $F_2/F_1$ ("first silicon tetrachloride flow rate")/("second silicon tetrachloride flow rate") is set to be no less than 0.69 and no greater than 1.03.

Furthermore, in addition to the core deposition burner and the cladding deposition burner adjacent thereto, it is preferable that a burner for depositing an outer cladding be provided. The initial deposition stage that occurs before the gas conditions reach a steady state is the stage during which deposition up to a distance of d/4 from the bottom end of the starting member is performed, with d representing the length of the tapered portion from the bottom end of the starting member.

Embodiments

The following describes an embodiment and comparative examples. A porous glass deposition body was manufactured and subjected to sintering and transparent vitrification using a core deposition burner, an intermediate cladding deposition burner, and an outermost cladding deposition burner. The positions, gas conditions, and the like for the core deposition burner and the outermost cladding deposition burner are the same in each case.

First Embodiment

The stage for forming the first ¼ of the tapered portion from the bottom end of the starting member was performed via deposition with the gas conditions shown below set for each burner. Specifically, the core deposition burner was supplied with 7.5 L/min of oxygen, 5.0 L/min of hydrogen, 0.4 L/min of argon, and 0.40 L/min of silicon tetrachloride. The intermediate cladding deposition burner was supplied with 14 L/min of oxygen, 14 L/min of hydrogen, 2.2 L/min of argon, and 0.3 L/min of silicon tetrachloride. The raising speed was 1.0 mm/min and the rotational speed of the starting member was 20 rpm. With these manufacturing conditions, the glass raw material flow rate ratio $F_2/F_1$ ("first silicon tetrachloride flow rate")/("second silicon tetrachloride flow rate") was set to 0.75, which is no less than 0.69 and no greater than 1.03. As a result, in the glass rod resulting from the sintering process, melted residue was found in the region within a distance of 10 mm from the bottom end of the starting member, but this region is within the tapered region and there was no effect on trunk where the outer diameter is approximately constant.

First Comparative Example

The core deposition burner was supplied with 7.5 L/min of oxygen, 5.0 L/min of hydrogen, 0.4 L/min of argon, and 0.40 L/min of silicon tetrachloride. The intermediate cladding deposition burner was supplied with 14 L/min of oxygen, 14 L/min of hydrogen, 2.2 L/min of argon, and 0.2 L/min of silicon tetrachloride. The raising speed was 1.0 mm/min and the rotational speed of the starting member was 20 rpm. With these manufacturing conditions, the glass raw material flow rate ratio $F_2/F_1$ ("first silicon tetrachloride flow rate")/("second silicon tetrachloride flow rate") was set to 0.5, which is less than 0.69. As a result, in the glass rod resulting from the sintering process, melted residue was found in the region within a distance of 115 mm from the deposition start point. This region enters into the trunk where the outer diameter is approximately constant.

Second Comparative Example

The core deposition burner was supplied with 7.5 L/min of oxygen, 5.0 L/min of hydrogen, 0.4 L/min of argon, and 0.40 L/min of silicon tetrachloride. The intermediate cladding deposition burner was supplied with 14 L/min of oxygen, 14 L/min of hydrogen, 2.2 L/min of argon, and 0.40 L/min of silicon tetrachloride. The raising speed was 1.0 mm/min and the rotational speed of the starting member was 20 rpm. With these manufacturing conditions, the glass raw material flow rate ratio F2/F1 ("first silicon tetrachloride flow rate")/("second silicon tetrachloride flow rate") was set to 1.10, which is greater than 1.03. As a result, in the glass rod resulting from the sintering process, melted residue was found in the region within a distance of 115 mm from the deposition start point. This region enters into the trunk where the outer diameter is approximately constant.

As described above, at the initial deposition stage before the gas conditions reach a steady state, by setting the glass raw material flow rate ratio F2/F1 ("first silicon tetrachloride flow rate")/("second silicon tetrachloride flow rate") to be no less than 0.69 and no greater than 1.03 at the same longitudinal positions of the soot deposition body, the amount of melted residue in the region that is initially deposited can be reduced, thereby enabling the manufacture of optical fiber base material with high yield.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

LIST OF REFERENCE NUMERALS

1: core deposition burner, 2: intermediate cladding deposition burner, 3: outermost cladding deposition burner, 4: porous glass deposition body, 5: starting member

What is claimed is:

1. A method of manufacturing an initial portion of a glass deposition body for optical fiber comprising:
    raising and rotating a starting member;
    supplying a core deposition burner with first L/min amounts of a plurality of gasses, and a first silicon tetrachloride flow rate F1 increased over time while in an upper quarter-length of a tapered portion of the glass deposition body, the upper quarter-length of the tapered portion of the glass deposition body being from a bottom end of the starting member to a distance of d/4 from the bottom end of the starting member, where d is a distance from the bottom end of the starting member to a top of a substantially constant diameter portion of the glass deposition body;
    using the core deposition burner, depositing soot in the upper quarter-length of the tapered portion of the glass deposition body at a deposition rate increased over time to create soot having a first density on the starting member including a bottom end of the starting member for forming a core of the glass deposition body as the starting member is raised and rotated, the bottom end being a bottommost point of the starting member;
    supplying a cladding deposition burner with second L/min amounts of the plurality of gasses being higher than the first L/min amounts, and a second silicon tetrachloride flow rate F2 increased over time while in the upper quarter-length of the tapered portion of the glass deposition body;
    using the cladding deposition burner, depositing soot in the upper quarter-length of the tapered portion of the glass deposition body at a deposition rate increased over time to create soot having a second density over the soot deposited by the core deposition burner for forming a cladding over the core as the starting member is raised and rotated, the second density being lower than the first density; and
    setting and maintaining a silicon tetrachloride L/min rate F2/F1 ratio at a constant ratio of no less than 0.69 and no greater than 1.03 while in the upper quarter-length of the tapered portion of the glass deposition body;
    wherein the core is a sole core formed in the glass deposition body.

2. The method according to claim 1, further comprising depositing, using an outermost cladding deposition burner, soot in the upper quarter-length of the tapered portion of the glass deposition body at a deposition rate increased over time to a third density over the soot deposited by the cladding deposition burner, as the starting member is raised and rotated, the third density being different from the first density and the second density.

* * * * *